United States Patent Office 3,201,663
Patented Aug. 17, 1965

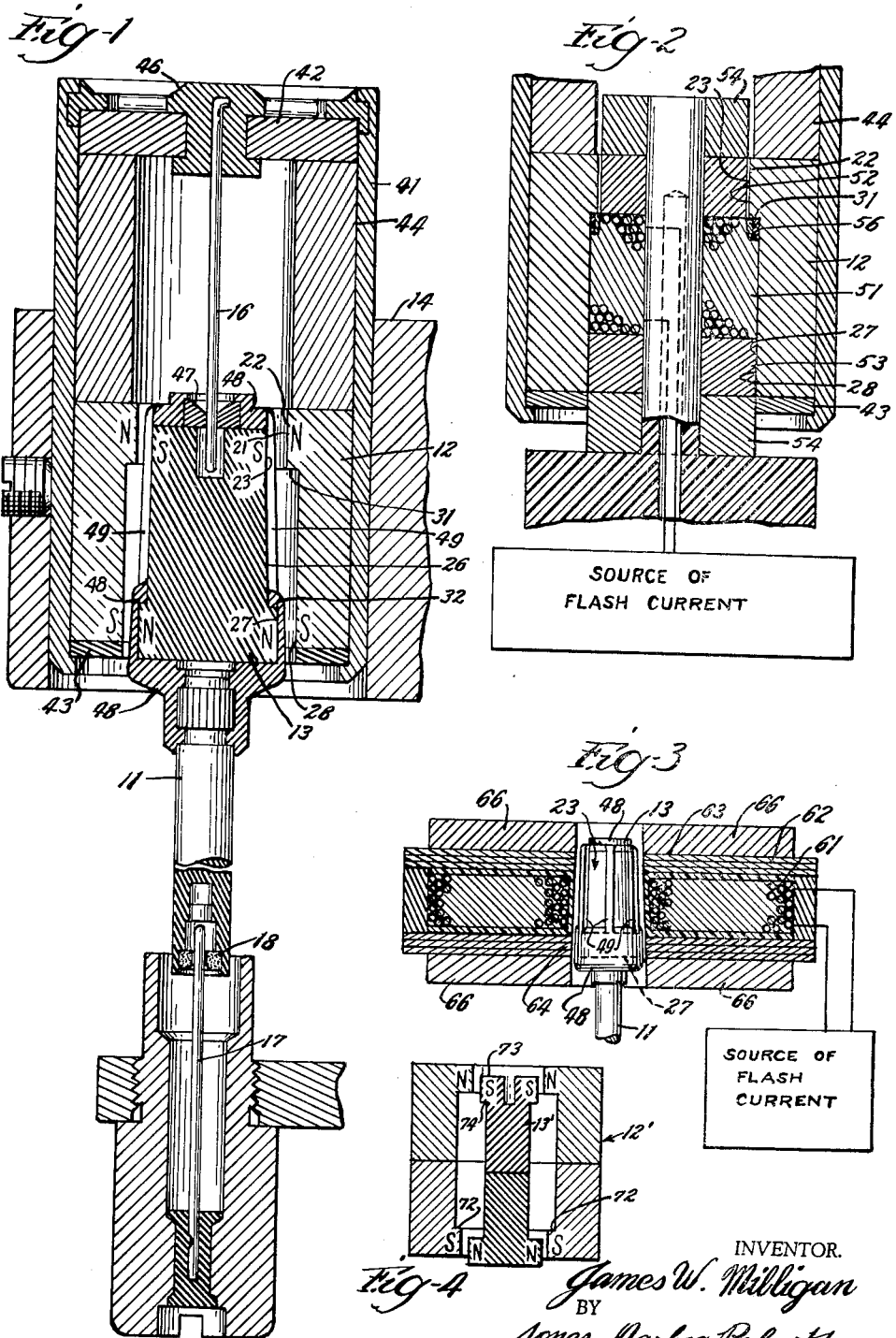

3,201,663
MAGNETIZING METHOD
James W. Milligan, West Lafayette, Ind., assignor to Duncan Electric Company, Inc., Lafayette, Ind., a corporation of Indiana
Original application Oct. 16, 1958, Ser. No. 767,560, now Patent No. 3,114,582, dated Dec. 17, 1963. Divided and this application Sept. 27, 1963, Ser. No. 318,468
6 Claims. (Cl. 317—201)

This application is a division of the present inventor's copending application, Serial Number 767,560, filed October 26, 1958, issued as Patent No. 3,114,582, December 17, 1963, which in turn was copending with the applications mentioned in the next paragraph.

There have been many proposals for suspending rotating parts magnetically so that the weight of the rotating parts does not cause any friction. The disk and shaft comprising the rotating element of watthour meters has been successfully suspended magnetically for some years. The copending application Serial No. 359,989, filed June 8, 1953, Patent 2,869,934, with which may be considered Patent 2,869,935, in both of which the present patentee was joined by Stanley S. Green, taught principles which can be used to produce greater stiffness than has been found in commercial magnetic suspensions heretofore.

Stiffness in a magnetic suspension as in a spring refers to the ability to yield only slightly when an added downward force may be applied to the suspended element. It should be understood that magnetic suspensions are in a state of equilibrium in which the upward magnetic pull exactly equals the downward pull of gravity on the suspended element. Should, for example, ten percent more weight be added to the rotating or suspended element, it must inevitably move downwardly until the increased upward magnetic forces again equal the increased weight. Stiffness in a magnetic suspension is the ability to gain this needed additional upward magnetic pull by a very minute downward movement of the suspended element.

According to the invention of the present application, a method of magnetization is provided which largely confines the magnetizing flux to flux passing generally perpendicularly through the pole faces, thereby aiding in achieving maximum stiffness.

DESIGNATION OF FIGURES

FIGURE 1 is a vertical sectional view of a form of magnet chosen for illustration, applied to a spindle such as that of a watthour meter, intervening parts being omitted. Such a magnet is one as to which the method of magnetization according to the present invention is especially useful.

FIGURE 2 is a sectional view showing magnetization of the stator of FIG. 1.

FIGURE 3 is a sectional view showing magnetization of the rotor magnet of FIG. 1.

FIGURE 4 is a sectional view of a modified form of the suspension magnets.

GENERAL DESCRIPTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The structure of the parent application, to which the present invention may be applied has been illustrated as it might be found in a watthour meter for magnetically supporting the spindle or shaft 11 thereof by which the rotary disk is carried. The entire weight of the rotary element is supported magnetically by attraction between magnet 12 and a rotor magnet 13. The stator magnet 12 is carried by a bracket 14 of the meter frame, and the rotor magnet 13 is mounted on the upper end of spindle 11. A guide pin 16 tends to hold the rotor magnet 13 accurately centered within the stator magnet 12. Likewise, at the lower end of the shaft a guide pin 17, running in a bushing 18 which may be of graphite, tends to hold the lower end of the shaft accurately centered on its intended axis. Normally neither pin 16 nor 17 affects the vertical positioning of the shaft 11. The meter disk is preferably located relatively close to the lower bearing so that side thrusts exerted inductively on it have relatively little influence on the magnetic suspension, which is used as an upper bearing. The meter is preferably designed to minimize such side thrusts.

MAGNET DATA AND PRINCIPLES

The stator magnet 12 preferably has a hollow cylindrical body formed with an integral inwardly extending magnetic pole 21 terminating with an annular pole face 22 which faces inwardly (toward the axis and toward the rotary magnet 13). The rotor magnet 13 has a corresponding annular pole face 23 facing outwardly. In the form illustrated in FIG. 1, no dimensional demarcation distinguishes the pole face 23 from the body of the magnet 13.

The rotary magnet 13 is shaped with an enlarged annular pole portion 26 terminating in an annular pole face 27 which faces outwardly (away from the axis and toward the stator magnet 12). The lower portion of the stator magnet 12 forms an inwardly facing annular face 28. It also is shown in FIG. 1 without dimensional demarcation distinguishing it from the body of stator magnet 12.

The magnets 12 and 13 are permanent magnets magnetized oppositely so that pole face 22 attracts pole face 23, and pole face 28 attracts pole face 27. When the pole faces 23 and 27 are in the position shown in FIG. 1, displaced slightly downwardly from pole faces 22 and 28, the magnetic attraction applies an upward or lifting force to the rotary element. If the rotor magnet 13 were moved upwardly to a neutral position the upward force would be reduced to zero. As the rotor magnet 13 moves downwardly by gravity, the upward force increases until it equals the weight of the rotary element, at which time the downward movement of the rotary element ceases, and a condition of vertical stability is reached.

VERTICAL STIFFNESS WITH LOW SIDE THRUST

For various reasons, it is important to achieve a characteristic which may be called "stiffness" or "vertical stiffness." The meaning is similar to stiffness in a spring. Once the rotary element has reached its position of stability there will be only very minute rising or falling from this position as minor forces tend to lift or lower the rotary element. In other words, it is desired that the rotary element have a low ratio of vertical movement to applied vertical force.

As pointed out in the prior Patents 2,869,934 and 2,869,935 mentioned, one factor which can contribute importantly toward the desired vertical stiffness is the use of annular poles which face as the poles here shown face, and which are abruptly defined in the direction of relative displacement of the other face. Thus the pole face 22 is abruptly terminated by the shoulder 31 forming the bottom edge of face 22. Likewise, the face 23 is abruptly terminated by the upper face of magnet 13 which forms the upper edge of face 23. In similar manner pole face 27 is abruptly terminated by shoulder 32, and pole face 28 is abruptly terminated by the lower face of magnet 12.

The provision of sharp dimensional definition of each pole face in the direction of relative displacement of the opposite face from it contributes toward vertical stiffness of the magnetic suspension because it inhibits creepage or shifting of the flux from the pole face to an adjacent surface. There tends to be no place for the flux to go (readily) except from pole face to opposite pole face.

Although the illustrated magnetic suspension in the prior application mentioned, now Patent 2,869,934, provided only one pair of inwardly and outwardly facing poles, the present preferred form of the invention provides two such pairs, each with proper abrupt dimensional demarcations. Accordingly, great vertical stiffness can be achieved.

Another desirable characteristic of magnetic suspensions is low side thrust. As the rotor, in the type of suspensions here illustrated, is displaced from its true central position, magnetic side thrust appears, and increases as the displacement increases. This side thrust creates friction on the pin 16, and is objectionable. It is therefore desirable to keep the side thrust, or the ratio of side thrust to eccentric displacement, low. The side thrust ratio can be reduced by increasing the gap length, namely, the spacing from one pole face to the opposed pole face, or by decreasing the flux density in the gap. But those changes also reduce the vertical stiffness. However, the sharp dimensional demarcation of the pole faces already referred to which increases the vertical stiffness, and other factors which increase the vertical stiffness, tend to make a greater gap length or lower density tolerable as to stiffness, and these in turn reduce the side thrust. Accordingly, although the two pairs of poles illustrated both have some side thrust, and any side thrust is inherently undesirable, their characteristics of high vertical stiffness permit a design which keeps the side thrust within tolerable limits.

MAGNETIC MATERIAL

Vertical stiffness is increased and side thrust reduced by using magnetic materials of very high coercive force at the pole faces, preferably in a state having very low incremental permeability. This is one of the important subjects covered by Milligan and Green Patent 2,869,935. The invention of Patent 2,869,935 provides such material at all pole faces at very low cost and with a high degree of magnetic uniformity. Magnetic uniformity is desirable to prevent magnetic locking. If each of the opposing pole faces was peripherally non-uniform so that each had a magnetically strong zone, these two magnetically strong zones would tend to attract one another and resist the turning of the rotor which would separate them. According to the present invention magnetic uniformity, pole faces with proper sharp dimensional demarcation, and economy of construction are all achieved by using powder-molded magnets. The magnetic material at present preferred is powdered Alnico XII. The composition of this material in parts by weight is:

*Alnico XII*

| | |
|---|---|
| Cobalt | 35 |
| Nickel | 18 |
| Aluminum | 6 |
| Titanium | 8 |
| Iron | 33 |

This powder molding of magnets is a known art. It can be performed, for example, in accordance with Mendelsohn Patent 2,724,174. According to the present preferred practice however, an epoxy resin is used as a binding material, and one is chosen which has a high distortion temperature and which in curing goes through a liquid or near liquid phase which permits close dimensional production.

MAGNETIC STABILITY

It is important that magnetic suspensions be characterized by high magnetic stability. Of course this partly means choosing the right permanent magnet material and stabilizing with proper knockdown and other known treatments. Alnico XII is one such material. However, no material is completely immune to further permanent change from external influences, and careful shielding from external or stray magnetic fields is important. In the illustrated form of the invention, the shielding has been found to be exceptionally good and includes both conductive metal shielding and soft iron shielding. It is provided at very low cost, some of the parts being provided for structural reasons anyway, and other parts being simple and of very low cost.

Soft iron shielding consists of the shell 41 and a cap 42. Both may be formed of cold-rolled steel and preferably the cap has a snug fit within the shell. They not only serve to shield the permanent magnets by diverting around them flux which would otherwise pass through them, but they also support the guide pin 16 in true centered relationship with respect to the magnet 12. Because the pole faces of stator magnet 12 are at the inner face of the magnet, the shell 41 can snugly engage the periphery with beneficial slimness and without excessive magnetic loss. In fact, with the magnetization described below, the shell 41 actually improves the lift, carrying some useful flux. The mid-portion of magnet 12 is largely by-passed.

The electroconductive shielding includes an aluminum washer 43 and an aluminum bushing 44 at opposite ends of the stator magnet 12. Also, the diecast metal to be described furnishes some electroconductive shielding.

The stator parts may be all held together economically by diecast metal. The die forms a jig which exactly positions the pin 16 with respect to the magnet 12.

Likewise the rotor magnet 13 may be held in proper place on spindle 11 and bearing bushing 47 held in proper place on magnet 13 by assembling these parts in a die in which is cast diecast metal 48. All of the parts marked 48 adjacent rotor magnet 13 in FIG. 1 are integral portions of the same diecasting as are ribs 49. There are six ribs 49 evenly spaced, which not only hold the other parts of the diecasting together but also serve as non-magnetic spacers for preventing contact of any of the pole faces with one another. This is desirable during insertion of rotor magnet 13 within stator magnet 12 because the upper end of magnet 13 has the same polarity as the lower end of magnet 12 and bringing their pole faces into contact could cause a slight localized "knockdown" with resulting non-uniformity peripherally. Even after insertion or in fully assembled condition, contact between the pole faces should be avoided since the attraction would be so great that the parts might not free themselves to resume their normally concentric position.

MAGNETIZATION

As described but not claimed in the prior Patents 2,869,934 and 2,869,935 mentioned, it is desirable that the magnets 12 and 13 be magnetized by flux which extends perpendicularly to the pole faces while flux is largely excluded from adjacent surface faces. With the forms of magnet illustrated in FIG. 1, this can be accomplished according to principles illustrated in FIGS. 2 and 3. Thus in FIG. 2 there is a magnetizing coil 51 having at its opposite ends annular magnetically soft, preferably laminated steel poles 52 and 53. These have a snug fit with pole faces 22 and 28 so as to concentrate the magnetizing flux perpendicularly through them. Heavy electroconductive washers 54 beyond the poles in both directions from the coil, and washers 43 and 44 resist a quick surge of magnetism through them to the end faces of magnet 12. Similarly, electroconductor 56 just inside the pole 52 can resist a surge of magnetism through the face of shoulder 31. Conductor 56 may be a ring or formed of overlapping split rings or short lengths. Thus substantially all of the magnetizing flux in the vicinity of pole face 22 is generally perpendicular to and passes through that face.

The electroconductive rings are effective only for very brief shots of magnetizing flux. Accordingly the coil 51 should be energized by a brief flash of current, and a source for such current has been indicated on the drawings. Magnets have been magnetized before with impulse current sources, but not (so far as known) to co-operate with the electroconductive shields to confine the resulting magnetism to the intended pole face, nor with the very brief impulses or flashes here preferred. The electroconductive rings could be replaced by properly wound conductors connected to a source of current, with the same effect; that being the form of the present invention illustrated in the prior application mentioned, now Patent 2,869,934, the disclosure of which is hereby incorporated herein by reference.

In FIG. 3 a magnetizer of similar principles is provided for rotor magnet 13. This is a doughnut-shaped device energized by a coil 61. A shell 62 of soft magnetic material is built around the coil 61 forming annular poles 63 and 64, preferably laminated, snugly fitting the diecast metal 48 and ribs 49 to be as close as possible to pole faces 23 and 27, respectively. Electroconductors 66 may substantially exclude flux from entering the end faces of magnet 13. Diecast metal 48 adjacent shoulder 32 may to some extent similarly protect shoulder 32. The source of current again is of the flash type. A copper ring can be added to the magnetizing fixture just above the face of pole 64, to additionally help keep flux from the face of shoulder 32.

POLES DEFINED ON BOTH SIDES

FIG. 4 illustrates a construction of stator magnet 12' and of rotor magnet 13' which provides annular pole faces dimensionally defined along both edges. Thus stator 12' has an inwardly extending lower pole 71 defined by shoulder 72, and rotor magnet 13' has an outwardly enlarged upper pole 73 defined by shoulder 74. To facilitate powder molding, each of these magnets may be made in two pieces as indicated.

ADDITIONAL DATA

It is preferred that the source of flash current be one which provides an exceedingly brief impulse of current. For example, it might use a half cycle of current derived from an oscillatory circuit. Good results have been obtained with an oscillating system having a frequency in the order of at least 5 kilocycles, highly dampened with resistance. Unless experiment shows to the contrary, however, it may be assumed that the flashes may be considerably longer than this would indicate. Some reduced benefits from the electroconductive metal during magnetization for shielding certain areas from magnetizing flux might result, but it is believed that there would still be a fair degree of shielding even if the impulses were, for example, a thousandth of a second.

The parts referred to as electroconductive preferably have at least the conductivity of aluminum, except the diecast metal, for which a lower conductivity must be accepted. In the magnetizer, copper or even silver is preferred.

I claim:

1. The method of magnetizing a permanent magnet, having a pair of pole faces of which at least one is an annular radially facing pole face, comprising applying close to its pole faces the pole pieces of a magnetizer having a coil and pole pieces energized thereby, and positioning an electroconductor adjacent the radially facing pole face just outside of the direct path between it and the pole piece close to it, passing a current through said coil, and contemporaneously also causing a current to flow in said electroconductor in a direction to inhibit passage of flux through the surface of the permanent magnet adjacent to its pole face.

2. The method of magnetizing a permanent magnet to sharply concentrate flux through a pole face thereof, comprising applying close to its pole face the pole piece of a magnetizer having a coil and pole piece energized thereby, and positioning an electroconductor adjacent the pole face just outside of the direct path between it and the the pole piece close to it, passing a current through said coil, and contemporaneously also causing a current to flow in said electroconductor in a direction to inhibit passage of flux through the surface of the permanent magnet adjacent to its pole face.

3. The method of magnetizing a permanent magnet to produce sharp contrast between a pole face thereof and an adjacent surface, comprising applying close to the permanent magnet a magnetizer having a coil and constructed to cause flux to pass through the magnet and said pole face, and positioning an electroconductor adjacent the pole face just outside of the direct path perpendicularly through it, passing a current through said coil, and contemporaneously also causing a current to flow in said electroconductor in a direction to inhibit passage of flux through the surface of the permanent magnet adjacent to its pole face.

4. The method of magnetizing a permanent magnet to produce sharp contrast between a pole face thereof and an adjacent surface, comprising applying close to the permanent magnet a magnetizer having a coil and constructed to cause flux to pass through the magnet and said pole face, and positioning an electroconductor adjacent the pole face just outside of the direct path perpendicularly through it, passing a current through said coil, and contemporaneously inhibiting passage of flux through the surface of the permanent magnet adjacent to its pole face.

5. The method of magnetizing a permanent magnet to produce sharp contrast between a pole face thereof and an adjacent surface, comprising applying close to the permanent magnet but spaced from it a magnetizer having a coil and constructed to cause flux to pass through the magnet and said pole face, and positioning an electroconductor adjacent the pole face just outside of the direct path perpendicularly through it, passing a current through said coil of flash nature to simultaneously provide said flux and induce a current to flow in said electroconductor in a direction to inhibit passage of flux through the surface of the permanent magnet adjacent to its pole face.

6. The method of magnetizing a permanent magnet to produce sharp contrast between a pole face thereof and an adjacent surface, comprising applying close to the permanent magnet a magnetizer having a coil and constructed to cause flux to pass through the magnet and said pole face, passing a current through said coil, and contemporaneously inhibiting passage of flux through the surface of the permanent magnet adjacent to its pole face on the side thereof in the direction of intended displacement of an opposing pole face.

References Cited by the Examiner

UNITED STATES PATENTS

| 2,275,880 | 3/42 | Arey | 317—201 |
| 2,557,075 | 6/51 | Caputo | 308—10 |

OTHER REFERENCES

Moore: "Impulse Magnetizer for Permanent Magnets," Electronics, August 1955, pages 121–123.

LARAMIE E. ASKIN, *Primary Examiner.*

E. JAMES SAX, *Examiner.*